United States Patent
Wang

(10) Patent No.: US 11,178,358 B2
(45) Date of Patent: *Nov. 16, 2021

(54) METHOD AND APPARATUS FOR GENERATING VIDEO FILE, AND STORAGE MEDIUM

(71) Applicant: Tencent Technology (Shenzhen) Company Limited, Shenzhen (CN)

(72) Inventor: Zi Wang, Shenzhen (CN)

(73) Assignee: Tencent Technology (Shenzhen) Company Limited, Guangdon (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/119,372

(22) Filed: Dec. 11, 2020

(65) Prior Publication Data

US 2021/0099674 A1 Apr. 1, 2021

Related U.S. Application Data

(63) Continuation of application No. 17/007,664, filed on Aug. 31, 2020, now Pat. No. 10,904,482, which is a
(Continued)

(30) Foreign Application Priority Data

Jul. 10, 2018 (CN) .......................... 201810751296.9

(51) Int. Cl.
*H04N 7/14* (2006.01)
*H04N 5/265* (2006.01)
(Continued)

(52) U.S. Cl.
CPC ............ *H04N 7/147* (2013.01); *H04N 5/265* (2013.01); *H04N 21/4307* (2013.01); *H04N 21/4788* (2013.01); *H04N 21/47205* (2013.01)

(58) Field of Classification Search
CPC combination set(s) only.
See application file for complete search history.

(56) References Cited

U.S. PATENT DOCUMENTS 9,654,727 B2 * 5/2017 Chung ............... H04N 21/4307
10,609,332 B1 * 3/2020 Turbell .................. H04N 7/152
(Continued)

FOREIGN PATENT DOCUMENTS

CN 101489087 A 7/2009
CN 101616295 A 12/2009
(Continued)

OTHER PUBLICATIONS

International Search Report and Written Opinion for International Patent Application No. PCT/CN2019/090346 dated Aug. 28, 2019; 12 pages.
(Continued)

*Primary Examiner* — Phung-Hoang J Nguyen
(74) *Attorney, Agent, or Firm* — Crowell & Moring LLP

(57) ABSTRACT

A method and a device for generating a composite video, and a storage medium are disclosed in embodiments of this disclosure. The method includes: obtaining pre-recorded source video frames; determining a first set and a second set of video rendering parameters; displaying the pre-recorded source video frames with a first image size at a first image position on a display screen of the terminal device according to the first set of video rendering parameters; capturing real-time video frames using an image acquisition component of the terminal device in response to content of and in
(Continued)

synchronization with the displayed pre-recorded source video frames; displaying the real-time video frames with a second image size at a second image position on the display screen of the terminal device according to the second set of video rendering parameters; and generating a composite video with each video frame comprising a first corresponding frame from the pre-recorded source video frames and a second corresponding frame from the real-time video frames based on the first image size, the second image size, the first image position, and the second image position.

18 Claims, 7 Drawing Sheets

Related U.S. Application Data continuation of application No. PCT/CN2019/090346, filed on Jun. 6, 2019.

(51) Int. Cl.
*H04N 21/43* (2011.01)
*H04N 21/472* (2011.01)
*H04N 21/4788* (2011.01)

(56) References Cited

U.S. PATENT DOCUMENTS

| | | | |
|---|---|---|---|
| 2009/0150802 A1* | 6/2009 | Do | G06F 3/011 715/757 |
| 2015/0091891 A1* | 4/2015 | Raheman | G06F 3/017 345/419 |
| 2017/0187776 A1 | 6/2017 | Pell | |
| 2018/0040304 A1* | 2/2018 | Choi | H04N 5/23293 |

FOREIGN PATENT DOCUMENTS

| | | |
|---|---|---|
| CN | 101938623 A | 1/2011 |
| CN | 103489210 A | 1/2014 |
| CN | 105120301 A | 12/2015 |
| CN | 105187733 A | 12/2015 |
| CN | 107170030 A | 9/2017 |
| CN | 107465818 A | 12/2017 |
| CN | 108924464 A | 11/2018 |

OTHER PUBLICATIONS

Youtube video: https://www.youtube.com/watch?v=nkSkiU-2yd0 Author: Dina Sem, Title: "How to Duet video (double or two video) in tik tok", Published on Jun. 20, 2018.
Office Action for Chinese Patent Application No. 201810751296.9 dated Jan. 20, 2021; 9 pages.

* cited by examiner

METHOD AND APPARATUS FOR GENERATING VIDEO FILE, AND STORAGE MEDIUM

RELATED APPLICATION

This application is a continuation application of U.S. application Ser. No. 17/007,664, filed on Aug. 31, 2020, which is a continuation of the International PCT Application No. PCT/CN2019/090346, filed with the China National Intellectual Property Administration, PRC on Jun. 6, 2019 which claims priority to Chinese Patent Application No. 201810751296.9, entitled "METHOD AND APPARATUS FOR GENERATING VIDEO FILE, AND STORAGE MEDIUM" and filed with the China National Intellectual Property Administration, PRC on Jul. 10, 2018, which are incorporated herein by reference in their entireties.

FIELD OF THE TECHNOLOGY

This disclosure relates to the field of electronic technologies, and in particular, to a method, an apparatus, and a storage medium for generating a video file.

BACKGROUND OF THE DISCLOSURE

As Internet technologies continually develop, various applications gains more and more functions. For example, in some applications, a function of a simulating video calls may be provided. By using the simulated video call, product may be advertised, and moreover, user may experience video call with celebrity. Accordingly, applications with such a function are more interesting and can attract more users who are fans of the celebrity, thereby improving popularity of the applications.

SUMMARY

An embodiment of this disclosure provides a method for generating a video file, executed by a terminal, including:
starting an image acquisition apparatus to acquire a user image in real time, and starting a video decoding component to decode a predetermined source video, in a case that a simulated video call request is received;
synchronously obtaining a user image frame currently acquired by the image acquisition apparatus and a source video image frame currently decoded by the video decoding component;
synthesizing the synchronously obtained user image frame with the source video image frame to obtain a simulated video call image frame; and
displaying the simulated video call image frame in a simulated video call window, and generating, according to all the obtained simulated video call image frames, a video file related to a simulated video call.

An embodiment of this disclosure further provides a terminal, including a memory and a processor, the memory storing computer-readable instructions, the instructions causing the processor to perform the operations of the method for generating a video file described above.

An embodiment of this disclosure further provides a non-transitory storage medium, storing processor executable instructions, the instructions, when executed by one or more processors, implementing the method for generating a video file described above.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show merely some embodiments of this disclosure, and a person of ordinary skill in the related art may still derive other drawings from these accompanying drawings without creative efforts.

DESCRIPTION OF EMBODIMENTS

Referring to the figures, same component symbols represent same components. A principle of this disclosure is described by using an example in which this disclosure is implemented in a proper computing environment. The following descriptions are based on specific embodiments shown in this disclosure, and is not to be considered as a limitation to other specific embodiments of this disclosure that are not described herein in detail.

In the following description, the specific embodiments of this disclosure are described with reference to steps performed by one or more computers and the symbols, unless indicated otherwise. Therefore, the steps and operations, which are at times referred to as being computer-executed, include the manipulation by a processing unit of a computer of electrical signals representing data in a structured form. This manipulation transforms the data or maintains the data at locations in a memory system of the computer, which reconfigures or otherwise alters the operation of the computer in a manner well understood by a person skilled in the art. Data structures in which the data is maintained are physical locations of the memory that have particular properties defined by the format of the data. However, while the principle of this disclosure is being described in the foregoing text, it does not represent a limitation. A person skilled in the art learns that the various steps and operations described below may also be implemented in hardware.

A term "module" used in the specification may be regarded as a software object executed in the calculation system. Different components, modules, engines, and services described in the specification may be regarded as objects implemented in the calculation system. The apparatus and method described in the specification are preferably implemented in a form of software, and definitely can be implemented in a form of hardware, both of which fall within the protection scope of this disclosure.

In a process of practical research and practice, the inventor of this disclosure finds that, if a user video is recorded first using a camera and then synthesized with a source video to obtain a video file of a simulated video call, because synthesizing two independent video sources requires a lot of computing resources, the synthesis speed is slow. Accordingly, the efficiency of generating the video file is low.

To resolve the foregoing technical problem, embodiments of this disclosure provide a method and an apparatus for generating a video file, and a storage medium.

The apparatus for generating a video file may be integrated into a terminal machine, such as a tablet computer, a personal computer (PC), or a mobile phone, which has a storage unit and is installed with a microprocessor to have a computing capability.

Figure 1:
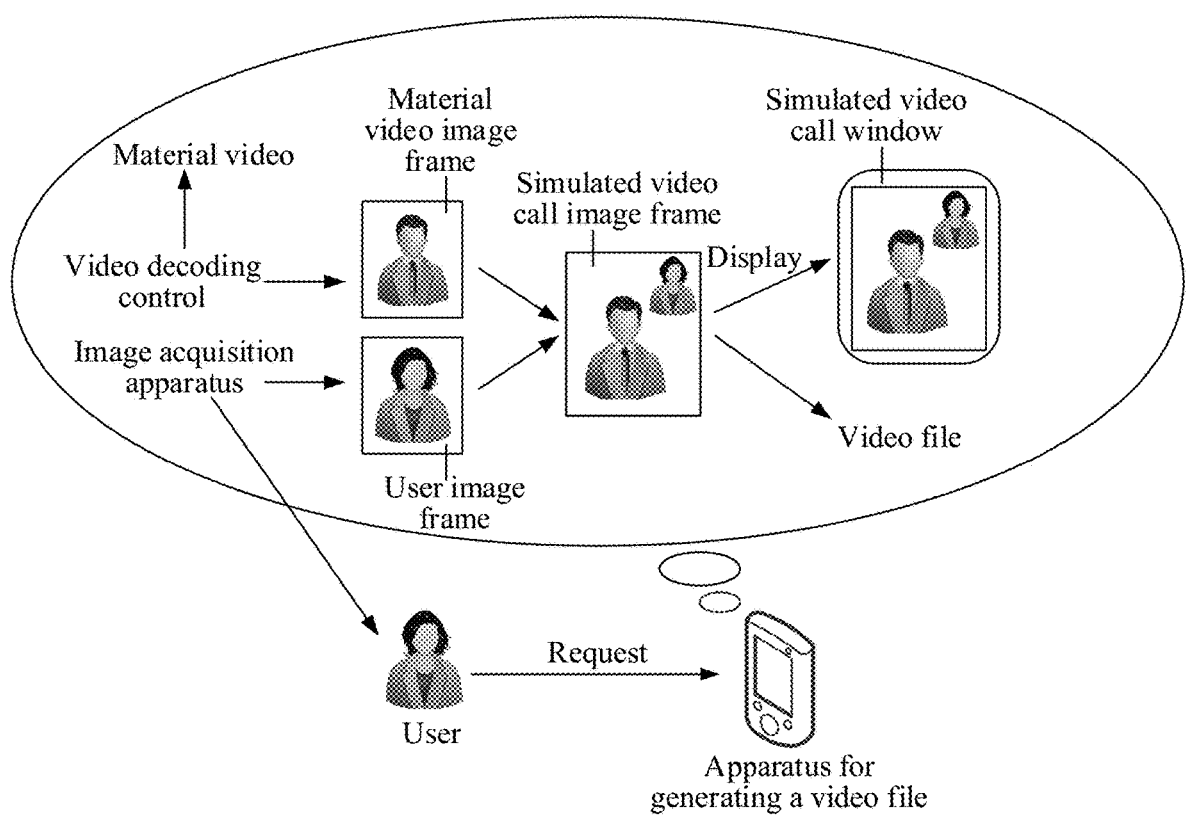
FIG. 1 is a schematic diagram of an exemplary scenario of a method for generating a video file according to an embodiment of this disclosure.

For example, as shown in FIG. 1, the apparatus for generating a video file includes at least one image acquisition apparatus. For example, the at least one image acquisition apparatus may be a front-facing camera of a terminal. The apparatus for generating a video file may be configured to receive a simulated video call request. The request, for example, may be generated by pressing a simulated video call request key on a page of an Internet application by a user. According to the request, the image acquisition apparatus is started to acquire a user image in real time, and a video decoding component is started to decode a predetermined source video. Then, a user image frame currently acquired by the image acquisition apparatus and a source video image frame currently decoded by the video decoding component are synchronously obtained. Next, the synchronously obtained user image frame and the source video image frame are synthesized to obtain a simulated video call image frame. Afterward, the simulated video call image frame is displayed in a simulated video call window, so that a simulated video call may be implemented, and a video file related to the simulated video call is generated according to all the obtained simulated video call image frames. Thus, by using the foregoing manner, this disclosure can reduce a video synthesis time, effectively reduce a time required for generating the video file, and improve efficiency of generating the video file.

Before this disclosure is introduced, a brief introduction is first made to the simulated video call function in this disclosure.

The simulated video call in this disclosure refers to simulation of a video call instead of a real video call between both communication parties. A source video is mainly preset in this disclosure. Playback content of the source video may be, for example, an advertisement or a campaign starred by a celebrity, or the like. The source video is played in the simulated video call window, the user image is acquired using the front-facing camera in real time. The acquired user image is also displayed in the simulated video call window, so that the user can see an image in the source video starred by the celebrity and an image of the user in the simulated video call window, to simulate a video call between the user and the celebrity. The content in the source video may be specifically as follows: A celebrity facing a screen says "hello, this is XXX", "I choose *** phone to take photos" and the like. When such content is played, the user may reply with "hello, this is XXX", and the like, to simulate a video call interaction with the celebrity, so that the Internet application is more interesting and achieves a better advertising result.

The simulated video call function in the embodiments of this disclosure may be applied to various Internet applications, such as an instant messaging application, friend circle, WeChat, Weibo, Qzone, and a social forum, so that the Internet applications can implement the simulated video call function. For example, a user interface, such as a key or button named "Experience a video call with XXX", may be provided on a Qzone page. The user may send a simulated video call request by pressing the key, to make the simulated video call.

Detailed descriptions are provided separately below.

Figure 2:
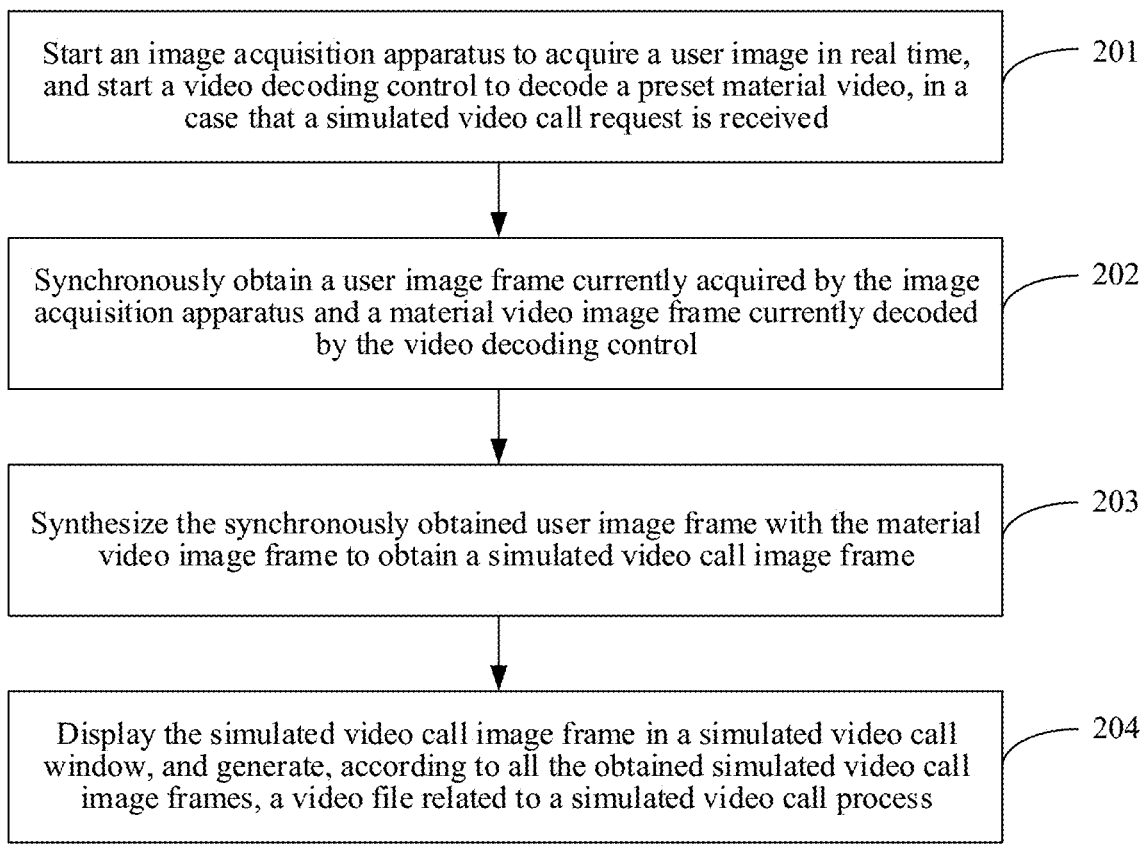
FIG. 2 is a schematic flowchart of a method for generating a video file according to an embodiment of this disclosure.

This embodiment is described from the perspective of a terminal. Referring to FIG. 2, a video image synthesis method of this embodiment, executed by a terminal, may include the following steps:

201. Start an image acquisition apparatus to acquire a user image in real time, and start a video decoding component to decode a predetermined source video, in a case that a simulated video call request is received.

The image acquisition apparatus may be, for example, a camera such as a front-facing camera of the terminal.

For example, a user interface, such as a key named "experience a video call with XXX", may be provided on an Internet application page. The user may send a simulated video call request by pressing the key, to make a simulated video call according to the request.

Figure 3:
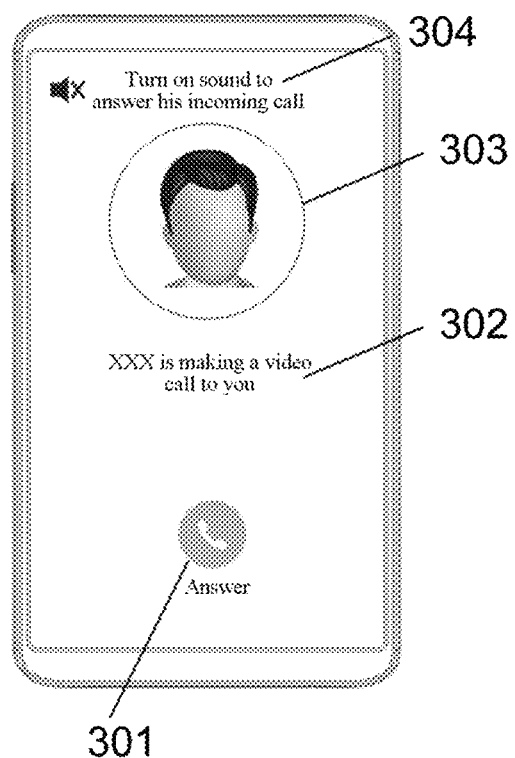
FIG. 3 is a schematic diagram of an incoming call interface of a simulated video call in a method for generating a video file according to an embodiment of this disclosure.

Further, as shown in FIG. 3, to allow the user to have a more realistic video call experience, the key of "experience a video call with XXX" may be a key for simulating an incoming call. After the user presses the key, the simulated video call window may be displayed. A size of the simulated video call window may be the same as a size of the screen. In this case, an "answer" key shown in 301 may be displayed on a display interface of the simulated video call window. In addition, information of a simulated video caller such as "XXX is making a video call to you" shown in 302 or a head portrait shown in 303 may be further displayed on the display interface. In addition, a key of whether to turn on a speaker, for example, "turn on sound to answer his incoming call" shown in 304, may be further provided on the display interface. The user may select, by using the speaker key, to use the speaker to play the sound or use a handset to play the sound, so as to simulate a real incoming call interface.

After the user presses the "answer" key, the simulated video call request is sent, so that the image acquisition apparatus, for example, the camera, is started according to the request, to acquire the user image in real time, and the video decoding component is started to decode the predetermined source video. The video decoding component may be, for example, a decoder in a video player. That is, the video player is started to process the source video in a case that the simulated video call request is received, so as to decode the source video, and obtain frames of source video images. In this step, starting the video player to process the source video does not mean playing the source video on the screen, but means a decoding process of the source video, to obtain decoded source video images to be further processed. The video decoding component may be hardware based or software based and there is no limitation imposed in this disclosure.

The source video is a prerecorded video. For example, to allow the user to simulate a video call with a celebrity, a video of the celebrity may be prerecorded, to obtain the source video.

In some embodiments, a plurality of optional source videos may be provided for the user. The plurality of source videos are stored in a material library. The plurality of source videos, for example, may be videos of different celebrities recorded in advance. The user may select a favorite celebrity to make a simulated video call. For example, after the user presses the key of "experience a video call with XXX", the plurality of source videos may be displayed, so that the user makes a selection. After the user selects one of the source videos, an "answer" interface shown in FIG. 3 is displayed, and the simulated video call request is initiated through the interface. In addition, there may be a variety of categories of source videos in the material library, for example, source videos about festivals and source videos about cities. The source video may be selected automatically according to a current time or a current location of the user. For example, after the user initiates the simulated video call request, the current time and location may be obtained, and a festival may be determined according to the current time and/or the current location of the user. Then, a source video related to the festival is selected as the predetermined source video. The source video may also be selected according to user's social network data, such as hobbies, age and gender of the user, hot topics of the user and user's friends in the social network.

202. Synchronously obtain a user image frame currently acquired by the image acquisition apparatus and a source video image frame currently decoded by the video decoding component.

The currently acquired user image frame is a frame of user image currently acquired. The currently decoded source video image frame is a frame of source video image currently decoded.

While the camera acquires the user image in real time, the video decoding component decodes the source video frame by frame. When the camera acquires a frame of user image, the frame of user image is obtained, and a frame of source video image currently decoded by the video decoding component is synchronously obtained. Further, upon detection that the user image frame obtained by the camera is updated, when the updated user image frame is obtained, the source video image frame currently decoded by the video decoding component is synchronously obtained, thereby synchronously obtaining the image.

203. Synthesize the synchronously obtained user image frame with the source video image frame to obtain a simulated video call image frame.

In this embodiment, each time a user image frame and a source video image frame are synchronously obtained, the synchronously obtained user image frame and the source video image frame are synthesized, to obtain a simulated video call image frame. Specifically, the following steps may be included:

(11) Obtain texture data of the user image frame and texture data of the source video image frame. The texture data may include the image data of an image frame.

The texture data may reflect a decorative design or a pattern of an image surface, or the like, and includes information such as a color and brightness of the image, or if the surface of the image is smooth or bumpy.

After the user image frame currently acquired by the camera is obtained, the texture data of the current user image frame is obtained, the source video image frame currently decoded by the video decoding component is synchronously obtained, and the texture data of the current source video image frame is also obtained.

(12) Render the texture data of the user image frame according to a first rendering parameter, to obtain a rendered user image frame, the first rendering parameter including a first image position and a first image size.

(13) Render the texture data of the source video image frame according to a second rendering parameter, to obtain a rendered source video image frame, the second rendering parameter including a second image position and a second image size.

(14) Synthesize the rendered user image frame with the rendered source video image frame, to obtain the simulated video call image frame.

The rendering parameter is a rule for rendering the texture data, and specifies a display position and a size of the rendered image. The first rendering parameter and the second rendering parameter may be set according to actual requirements.

In some embodiments, the first image position may be, for example, an upper right corner of the display interface of the video call window. The first image size may be, for example, smaller than that of the display interface of the video call window, and may specifically be ⅙, ¼, or the like of the size of the display interface. That is, the rendered user image frame is displayed at the upper right corner of the display interface of the video call window, and has a size of ⅙, ¼, or the like of the display interface. The second image position may be, for example, any position in the display interface of the video call window, for example, a middle position in the display interface. The second image size may be the whole display interface of the video call window. That is, the rendered source video image frame occupies the whole display interface of the video call window, and may be considered as a background picture of the display interface.

In step (14), the rendered user image frame is synthesized with the source video image frame. That is, the rendered user image frame is superposed on the rendered source video image frame. For example, the rendered user image frame is placed at the upper right corner of the source video image frame. The size of the rendered user image frame occupies ⅙, ¼, or the like of the source video image frame, while the source video image frame occupies the whole display interface of the simulated video call window. Therefore, the size of the obtained simulated video call image is the size of the display interface of the simulated video call window.

204. Display the simulated video call image frame in a simulated video call window, and generate, according to all the obtained simulated video call image frames, a video file related to a simulated video call.

Each time a simulated video call image frame is obtained, the obtained simulated video call image frame is displayed, so that the simulated video call images may be displayed frame by frame in the simulated video call window, thereby implementing the simulated video call. A process of displaying the simulated video call images frame by frame in the simulated video call window is a process of playing the simulated video call images in the simulated video call window by using the video player.

Figure 4:
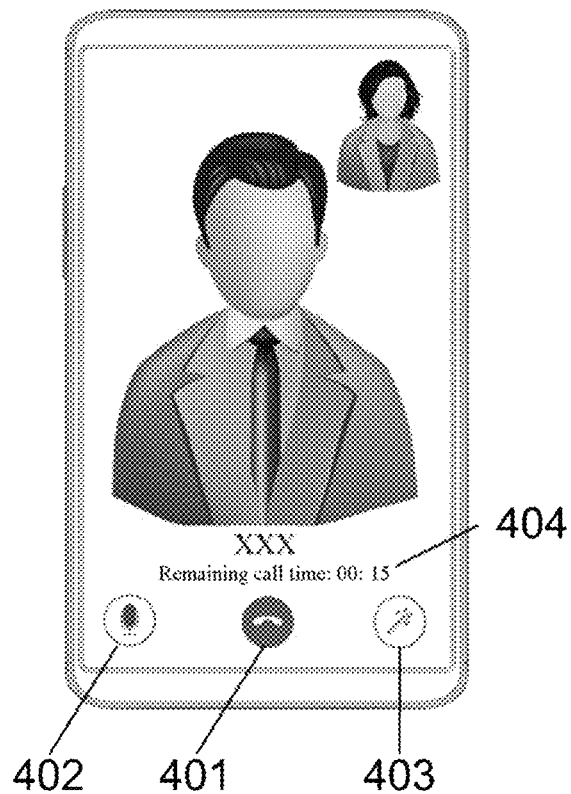
FIG. 4 is a schematic diagram of a call interface of a simulated video call in a method for generating a video file according to an embodiment of this disclosure.

As shown in FIG. 4, in this embodiment, the simulated video call images are displayed frame by frame in the simulated video call window. In the process of displaying the simulated video call images, a "hang up" key may be further displayed in the simulated video call window. The "hang up" key is, for example, the middle icon shown in FIG. 4. As shown in 401, when the user presses the "hang up" key, the simulated video call is ended. A microphone on/off key 402 may be further displayed. A key for adding a special effect to the image, that is, the right icon 403, may be further displayed. Therefore, in this embodiment, a special effect, filter, or the like may be added to the currently displayed simulated video call image by pressing a special effect icon. In addition, information such as "a remaining call time with XXX is XX: XX" shown in 404 may be further displayed in the simulated video call window. For example, duration of video that has not been decoded in the source video may be obtained to obtain the remaining call time. By using the foregoing manner, a real video call interface may be simulated, so that the user can obtain a more realistic video call experience, and the application is more interesting and engaging.

In addition, after the simulated video call is ended, the video file related to the simulated video call is generated according to all the obtained simulated video call image frames. The video file is a video playback of the simulated video call.

In this embodiment, a voice input apparatus is started after the simulated video call request is received, and first voice information is obtained by using the voice input apparatus. The first voice information includes voice information inputted by the user. The voice input apparatus is, for example, a built-in microphone of the terminal. In addition, when the simulated video call image frame is displayed in the simulated video call window, voice information of the source video currently played in the simulated video call window is further obtained, to obtain second voice information. The second voice information is voice information corresponding to the source video image frame included in the currently displayed simulated video call image frame, and based on this, the voice information corresponding to the simulated video call image frame is determined according to the first voice information and the second voice information. Therefore, after a simulated video call image frame is obtained through synthesis each time, when the simulated video call image frame is displayed, the voice information corresponding to the currently displayed simulated video call image frame may be determined according to the currently received first voice information and the obtained second voice information. When the simulated video call image frame is displayed, a voice corresponding to the source video image frame included in the currently displayed simulated video call image frame is also synchronously played.

The user may manually end the simulated video call, or the simulated video call may be ended automatically when a play time of the source video comes to an end. For example, when the user presses the "hang up" key as shown in 401 in FIG. 4 to end the simulated video call, that is, when an instruction for completing a simulated video call is received, a dialog box pop up to ask the user whether to save the video file of the simulated video call. If the user chooses to save the video file, the video file is generated according to the saving instruction of the user. Alternatively, in other implementations, the video file of the simulated video call may alternatively be directly generated when an instruction for ending the simulated video call is received.

In an implementation, the generating the video file, for example, may include: each time a simulated video call image frame is obtained through synthesis, performing video encoding on the simulated video call image frame to obtain a video frame corresponding to the simulated video call image frame; when a saving instruction of the user is received, generating a picture video according to all video frames, and generating an audio track file according to voice information corresponding to all the video frames respectively; and synthesizing the picture video with the audio track file to obtain the video file of the simulated video call. The voice information corresponding to the video frames is voice information that corresponds to the simulated video call image frames corresponding to the video frames.

In this manner, the display of the simulated video call image frame and the video encoding of the simulated video call image frame are synchronously performed. That is, after the user image frame and the source video image frame are synthesized to obtain a simulated video call image frame, the simulated video call image frame is displayed in the simulated video call window, and the simulated video call image frame is transmitted to a video encoder for the video encoding, to be converted to a video frame and stored in real time, instead of encoding all the simulated video call image frames one by one after the simulated video call is ended, thereby further reducing the time required for generating the video file.

Certainly, in another implementation, the generating the video file, for example, may include: when a saving instruction of the user is received, sequentially performing video encoding on all the obtained simulated video call image frames, to obtain a video frame corresponding to each simulated video call image frame; determining, according to voice information corresponding to each simulated video call image frame, voice information corresponding to the corresponding video frame; generating a picture video according to all the obtained video frames, and generating an audio track file according to voice information corresponding to all the video frames respectively; and synthesizing the picture video with the audio track file to obtain the video file related to the simulated video call.

In this manner, after the simulated video call is ended, all the simulated video call image frames are then encoded one by one, so that memory and CPU consumption during the simulated video call can be reduced, thereby improving fluency of the simulated video call.

In an embodiment of this disclosure, the picture video and the audio track file may be synthesized by using system hardware. The picture video and the audio track file are synthesized by using system hardware, so that a synthesis speed can be improved, and higher stability performance is achieved. When the hardware synthesis fails, third-party synthesis software may be used for synthesis. For example, ffmpeg audio video codec software is used for synthesizing the picture video with the audio track file.

In this embodiment of this disclosure, the user image frame currently acquired by the image acquisition apparatus and the source video image frame currently decoded by the video decoding component are synchronously obtained. Then, after the user image frame and the source video image frame are synthesized, the simulated video call image frame obtained through synthesis is displayed in the simulated video call window, to implement the simulated video call, so that the application is more interesting, attracts more users, and achieves an effect of advertising by using the source video.

In addition, in this embodiment of this disclosure, the user image frame and the source video image frame are first synthesized, so that the video file related to the simulated video call may be directly generated according to the simulated video call image frame obtained through synthesis. That is, the video encoding only needs to be performed on the simulated video call image frame. In addition, the synthesis between images, and the synthesis of the picture video and the audio track file in this embodiment of this disclosure are simpler and faster than synthesis between two videos. Therefore, compared with synthesizing two independent videos, this embodiment of this disclosure may generate the video file more quickly, reduce the time for generating the video file, and improve efficiency of generating the video file. In addition, in this embodiment of this disclosure, it is possible to perform the simulated video call (that is, display the simulated video call image frame) while performing video encoding on the simulated video call image frame to generate the video file, so that the time required for generating the video file can be further reduced.

To make the simulated video call more vivid, the user may answer when hearing voice of the source video played in the simulated video call window. For example, the voice of the source video is "hello, this is XXX", and the user may make a voice reply through a microphone. For example, the user may say "hi, nice to meet you". In addition, to increase interactivity with the user, after obtaining the first voice information by using the voice input apparatus, the method may further include: recognizing the first voice information, to obtain a recognition result; and obtaining, according to the recognition result, reply content matching the first voice information, to obtain third voice information, and playing the third voice information. Various voice information and corresponding reply content may be pre-stored. For example, voice information is "what kind of phone are you using", and corresponding reply content may be "I am using ** camera phone to make a video call with you". Voice recognition is performed on the first voice information inputted by the user, to recognize speech content of the user. Then, corresponding reply content is queried according to the recognition result, for example, by querying a predetermined reply content library, to obtain the third voice information, and the third voice information is played. The second voice information is voice information corresponding to the source video image frame included in the currently displayed simulated video call image frame. The determining, according to the first voice information and the second voice information, voice information corresponding to the simulated video call image frame includes: determining, according to the first voice information, the second voice information, and the third voice information, the voice information corresponding to the simulated video call image frame.

Figure 5:
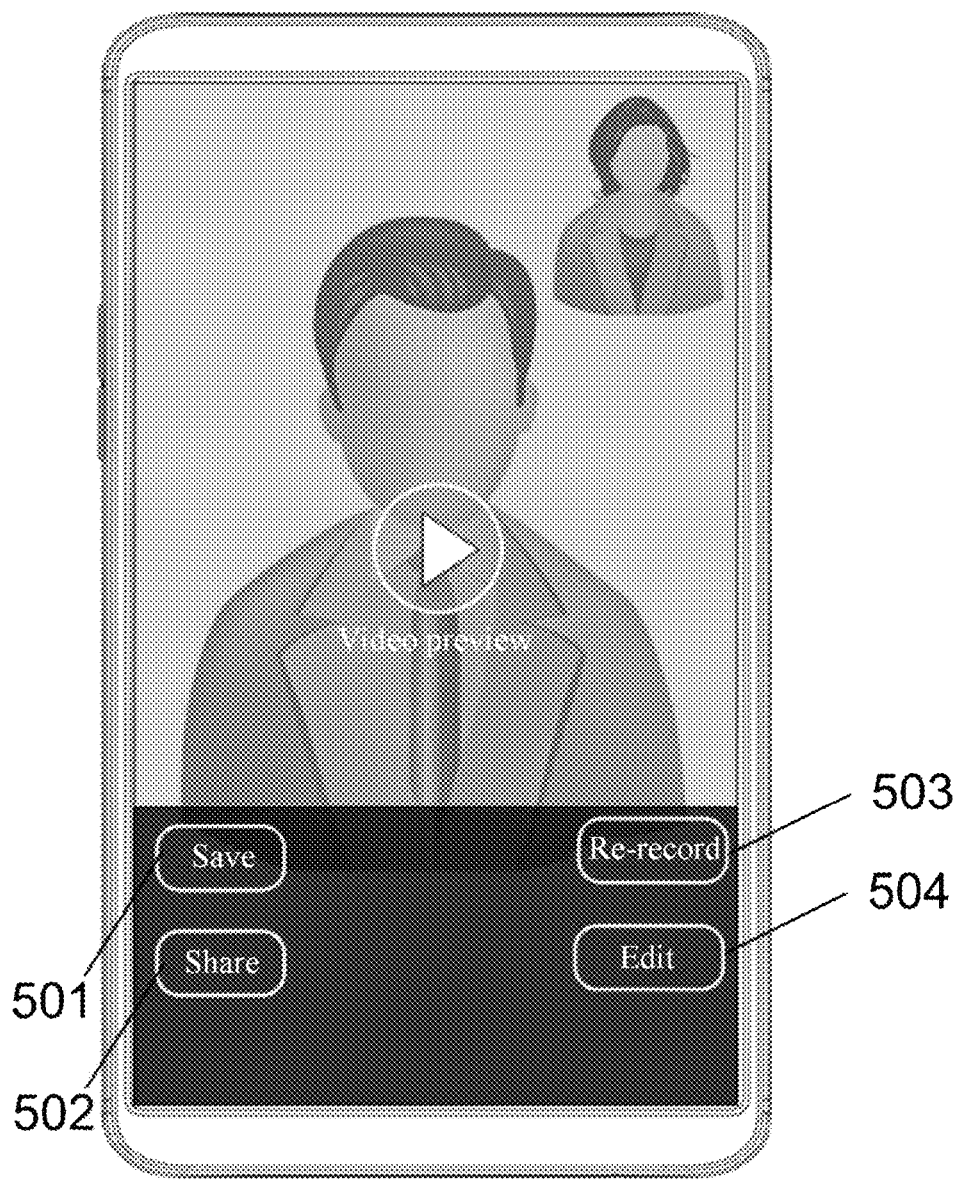
FIG. 5 is a schematic diagram of an interface of a preview window in a method for generating a video file according to an embodiment of this disclosure.

As shown in FIG. 5, in another embodiment of this disclosure, before the synthesizing the picture video with the audio track file, the method further includes: synchronously playing the picture video and the audio track file in a preview window, so that the user can preview the video file related to the simulated video call.

Specifically, after the user presses the "hang up" key as shown in FIG. 4 to end the simulated video call, the picture video is generated according to all the video frames, and the audio track file is generated according to the voice information corresponding to the video frames respectively, the preview window as shown in FIG. 5 may be displayed. That is, the preview window may be automatically launched, and the picture video and the audio track file may be automatically and synchronously played, to play a preview of the video file related to the simulated video call. The user may alternatively stop the preview manually. Keys such as a saving key shown in 501, an editing key shown in 504, a sharing key shown in 502, and a re-recording key shown in 503 are provided in the preview window. If a key is pressed, a corresponding event is triggered, to implement a corresponding function. When the user presses the saving key 501, the picture video and the audio track file are synthesized according to a saving instruction of the user, to generate the video file related to the simulated video call and store the video file. When the user presses the editing key 504, the picture video and the audio track file may be synthesized to generate the video file, and a video editing interface is displayed, so that the user may edit the video file. For example, the user may add an effect such as a filter or a special background to the video picture in the video file, or add a background sound or music. When the user presses the sharing key 502, the picture video and the audio track file may be synthesized to generate the video file, and various social networks application such as QQ, WeChat, and Weibo may pop up. The user may select one or more social networks to share the video file, so that the video file is shared, according to a sharing instruction of the user, to the social network selected by the user.

Using Qzone or the friend circle an example, when the user selects the "share" key 502, a post page of Qzone or a post page of the friend circle may be directly launched. The user may edit text information such as "I had a video call with XXX", or "XXX called me" in the page, and then post the video file together with the text in Qzone or the friend circle. Certainly, the foregoing text information may alternatively be generated automatically. That is, when the post page of Qzone is displayed, the foregoing text information may be generated in a text editing bar. The user may perform operations such as modification and deletion on the text information. Alternatively, after the user presses the sharing key 502, the video file may be directly posted, and relevant text information may be automatically generated and posted.

By providing the user with a function of sharing the video file related to the simulated video call, the user may share the video file to generate a hot topic in the social networks and friend circles, so that the advertisement in the source video reaches more viewers. The application is more interesting and can attract more users. In addition, in this embodiment, only one video player is needed to play the picture video in a preview stage. Compared with using two video players to process the source video and the user video respectively, memory resources occupied in the preview stage can be reduced, so that the requirement on the hardware of the terminal is lower, and a middle or low end terminal can be better supported, thereby achieving better stability and expansibility.

This embodiment is described from the perspective of the terminal, where the image acquisition apparatus being a camera is used as an example for description. In this embodiment, in a process of generating the video file, the source video image frame and the user image frame may be synthesized together through hardware of software. For example, by using open graphics library (OpenGL) rendering. The OpenGL is a professional graphics program interface that defines a cross-programming language and cross-platform programming interface specifications. OpenGL is mainly used for drawing three-dimensional images and two-dimensional images, and is an underlying graphics library having powerful functions and easy to invoke. There is no limitation on how the synthesis is performed in this disclosure.

Figure 6:
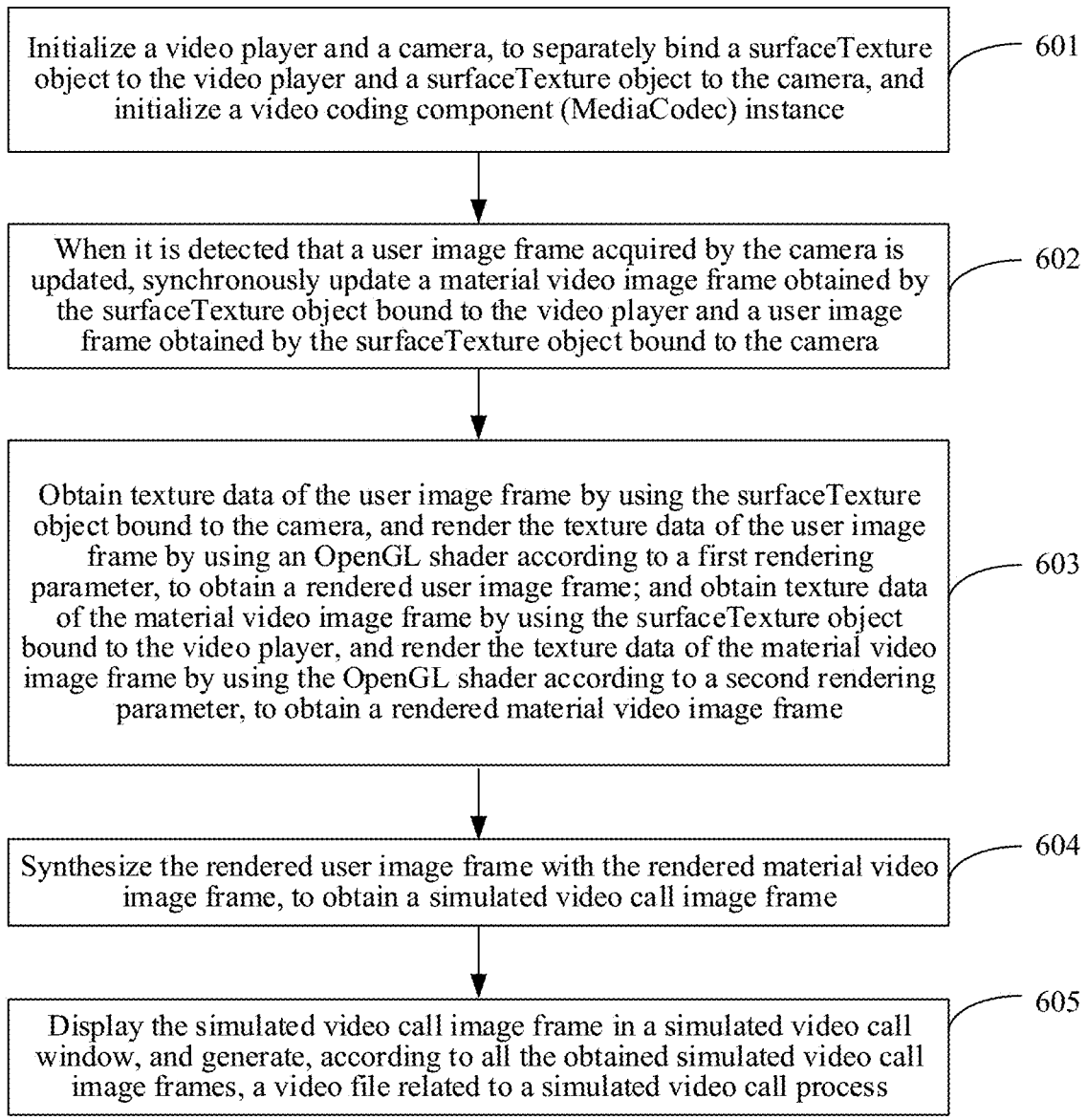
FIG. 6 is another schematic flowchart of a method for generating a video file according to an embodiment of this disclosure.

Referring to FIG. 6, a method for generating a video file in this embodiment, executed by a terminal, may include the following steps:

601. Initialize a video player and a camera, to separately bind a surfaceTexture object to the video player and a surfaceTexture object to the camera, and initialize a video encoding component instance, for example, MediaCodec.

The surfaceText may be used for capturing an image frame in a video stream. The video stream may be camera images or decoded video data, that is, decoded video frame pictures. By binding the surfaceText object to the video player, a source video image frame of a decoded source video may be obtained. Similarly, by binding the surfaceText object to an image acquisition apparatus, for example, the camera, a user image frame acquired by the camera may be obtained.

602. When it is detected that a user image frame obtained by the camera is updated, synchronously update a source video image frame obtained by the surfaceTexture object bound to the video player and a user image frame acquired by the surfaceTexture object bound to the camera.

Through step 602, the user image frame acquired by the camera may be obtained. When a user image frame is obtained, a source video image frame currently decoded by a video decoding component is synchronously obtained. When the user image frame acquired by the camera is updated, the updated user image frame is obtained by the surfaceTexture object bound to the camera, and the source video image frame currently decoded by the video decoding component is synchronously obtained, so that the source video image frame obtained by the surfaceTexture object bound to the video player and the user image frame obtained by the surfaceTexture object bound to the camera are synchronously updated, thereby implementing image synchronization.

603. Obtain texture data of the user image frame by using the surfaceTexture object bound to the camera, and render the texture data of the user image frame by using an OpenGL shader according to a first rendering parameter, to obtain a rendered user image frame; and obtain texture data of the source video image frame by using the surfaceTexture object bound to the video player, and render the texture data of the source video image frame by using the OpenGL shader according to a second rendering parameter, to obtain a rendered source video image frame.

Specifically, after the source video obtained by the surfaceTexture object bound to the video player and the user image obtained by the surfaceTexture object bound to the camera are synchronously updated, the texture data of the updated user image and the texture data of the updated source video image frame are obtained.

The rendered user image frame and source video image frame may be buffered in a frame buffer object (FBO). For example, the rendered user image frame is buffered in an FBO1, and the rendered source video image frame is buffered in an FBO2.

The first rendering parameter includes a first image position and a first image size. The second rendering parameter includes a second image position and a second image size. The first image position may be, for example, an upper right corner of the display interface of the video call window. The first image size may be, for example, smaller than that of the display interface of the video call window, and may specifically be ⅙, ¼, or the like of the size of the display interface. That is, the rendered user image frame is displayed at the upper right corner of the display interface of the video call window, and has a size of ⅙, ¼, or the like of the display interface. The second image position may be, for example, any position in the display interface of the video call window, for example, a middle position in the display interface. The second image size is the whole display interface of the video call window. That is, the rendered source video image frame occupies the whole display interface of the video call window, and may be considered as a background picture of the display interface.

604. Synthesize the rendered user image frame with the rendered source video image frame, to obtain a simulated video call image frame.

The rendered user image frame is superposed on the rendered source video image frame, to synthesize the user image frame with the source video image frame. Further, the texture data of the rendered user image frame is superposed on the texture data of the rendered source video image frame, the superposed texture data is buffered in an FBO3, and the texture data in the FBO3 is rendered on GLsurfaceView, to obtain a simulated video call image frame.

605. Display the simulated video call image frame in a simulated video call window, and generate, according to all the obtained simulated video call image frames, a video file related to a simulated video call.

When the simulated video call image frame is displayed, the video encoding component instance may synchronously obtain the texture data buffered in the FBO3, to obtain the simulated video call image frame, and the texture data is then rendered, by using the OpenGL shader, to the surfaceView bound by using the video encoding component, so that the video encoding component obtains the simulated video call image frame from the surfaceView in a form of a task queue, and the video encoding is then performed to obtain a corresponding video frame, to generate the video file.

Compared with a manner of synthesizing the source video and the user video obtained by the camera to generate the video file, it is no longer needed to synthesize two independent videos in this embodiment of this disclosure. Video encoding only needs to be performed on frames of simulated video call images, so that the time required for generating the video can be greatly reduced, and efficiency of generating the video is improved.

Figure 7:
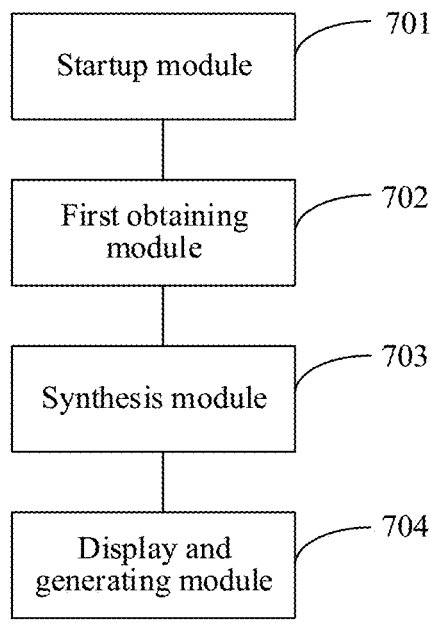
FIG. 7 is a schematic structural diagram of an apparatus for generating a video file according to an embodiment of this disclosure.

This embodiment provides an apparatus for generating a video file. The apparatus may be, for example, integrated into a terminal such as a mobile phone. Referring to FIG. 7, the apparatus for simulating a video call includes: a startup module 701, a first obtaining module 702, a synthesis module 703, and a display and generating module 704.

(1) Startup Module 701:

The startup module 701 is configured to: start an image acquisition apparatus to acquire a user image in real time, and start a video decoding component to decode a predetermined source video, in a case that a simulated video call request is received.

The image acquisition apparatus may be, for example, a camera of the terminal, for example, a front-facing camera.

For example, a user interface, such as a key named "experience a video call with XXX", may be provided on an Internet application page. The user may send a simulated video call request by pressing the key, to make a simulated video call according to the request.

The video decoding component is, for example, a decoder in a video player. That is, the video player is started to play the source video in a case that the simulated video call request is received, so as to decode the source video, to obtain frames of source video images. Starting the video player to play the source video does not mean playing the source video on the screen, but means a decoding process of the source video, to obtain a decoded source video image.

The source video is a prerecorded video. For example, to allow the user to simulate a video call with a celebrity, a video of the celebrity may be prerecorded, to obtain the source video.

(2) First Obtaining Module 702:

The first obtaining module 702 is configured to synchronously obtain a user image frame currently acquired by the image acquisition apparatus and a source video image frame currently decoded by the video decoding component.

While the camera acquires the user image in real time, the video decoding component decodes the source video frame by frame. When the camera acquires a frame of user image, the frame of user image is obtained, and a frame of source video image currently decoded by the video decoding component is synchronously obtained. Further, upon detection that the user image frame obtained by the camera is updated, when the updated user image frame is obtained, the source video image frame currently decoded by the video decoding component is synchronously obtained, thereby synchronously obtaining the image.

(3) Synthesis Module 703:

The synthesis module 703 is configured to synthesize the synchronously obtained user image frame with the source video image frame to obtain a simulated video call image frame. Specifically, the synthesis module 703 is configured to: obtain texture data of the user image frame and texture data of the source video image frame; then render the texture data of the source video image frame according to a first rendering parameter, to obtain a rendered source video image frame, the first rendering parameter including a first image position and a first image size; and render the texture data of the source video image frame according to a second rendering parameter, to obtain a rendered source video image frame, the second rendering parameter including a second image position and a second image size. Then, the rendered user image frame and the rendered source video image frame are synthesized, to obtain the simulated video call image frame.

In some embodiments, the first image position may be, for example, an upper right corner of the display interface of the video call window. The first image size may be, for example, smaller than that of the display interface of the video call window, and may specifically be ⅙, ¼, or the like of the size of the display interface. That is, the rendered user image frame is displayed at the upper right corner of the display interface of the video call window, and has a size of ⅙, ¼, or the like of the display interface. The second image position may be, for example, any position in the display interface of the video call window, for example, a middle position in the display interface. The second image size is the whole display interface of the video call window. That is, the rendered source video image frame occupies the whole display interface of the video call window, and may be considered as a background picture of the display interface.

The rendered user image frame is synthesized into the source video image frame. That is, the rendered user image frame is superposed on the rendered source video image frame. For example, the rendered user image frame is placed at the upper right corner of the source video image frame. The size of the rendered user image frame occupies ⅙, ¼, or the like of the source video image frame, while the source video image frame occupies the whole display interface of the simulated video call window. Therefore, the size of the obtained simulated video call image is the size of the display interface of the simulated video call window.

(4) Display and Generating Module 704:

The display and generating module 704 is configured to: display the simulated video call image frame in a video call window, and generate, according to all the obtained simulated video call image frames, a video file related to a simulated video call.

Each time a simulated video call image frame is obtained, the obtained simulated video call image frame is displayed, so that the simulated video call images may be displayed frame by frame in the simulated video call window, thereby implementing the simulated video call. A process of displaying the simulated video call images frame by frame in the simulated video call window is a process of playing the simulated video call images in the simulated video call window by using the video player.

The display and generating module 704 is specifically configured to: each time a simulated video image frame is obtained, perform video encoding on the obtained simulated video call image frame, to obtain a video frame corresponding to the simulated video call image frame; and generate, according to all the video frames, the video file related to the simulated video call, after receiving an instruction for completing a simulated video call. In other implementations, the display and generation module 704 may also sequentially perform the video encoding on all the obtained simulated video call image frames, after receiving the instruction for completing the simulated video call, to obtain a video frame corresponding to each simulated video call image frame, thereby generating, according to all the video frames, the video file related to the simulated video call.

In this embodiment of this disclosure, the user image frame currently acquired by the image acquisition apparatus and the source video image frame currently decoded by the video decoding component are synchronously obtained. Then, after the user image frame and the source video image frame are synthesized, the simulated video call image frame obtained through synthesis is displayed in the simulated video call window, to implement the simulated video call, so that the application is more interesting, thereby attracting more users and achieving a better advertising result by using the source video.

In addition, in this embodiment of this disclosure, the user image frame and the source video image frame are first synthesized, so that the video file related to the simulated video call may be directly generated according to the simulated video call image frame obtained through synthesis. Video encoding only needs to be performed on the simulated video call image frame. In addition, the synthesis between images in this embodiment of this disclosure is simpler and faster than synthesis between two videos. Therefore, compared with synthesizing two independent videos, this embodiment of this disclosure may generate the video file more quickly, so that the time for generating the video file can be reduced, thereby improving efficiency of generating the video file. In addition, in this embodiment of this disclosure, it is possible to perform the simulated video call (that is, display the simulated video call image frame) while performing video encoding on the simulated video call image frame to generate the video file, so that the time required for generating the video file can be further reduced.

Figure 8:
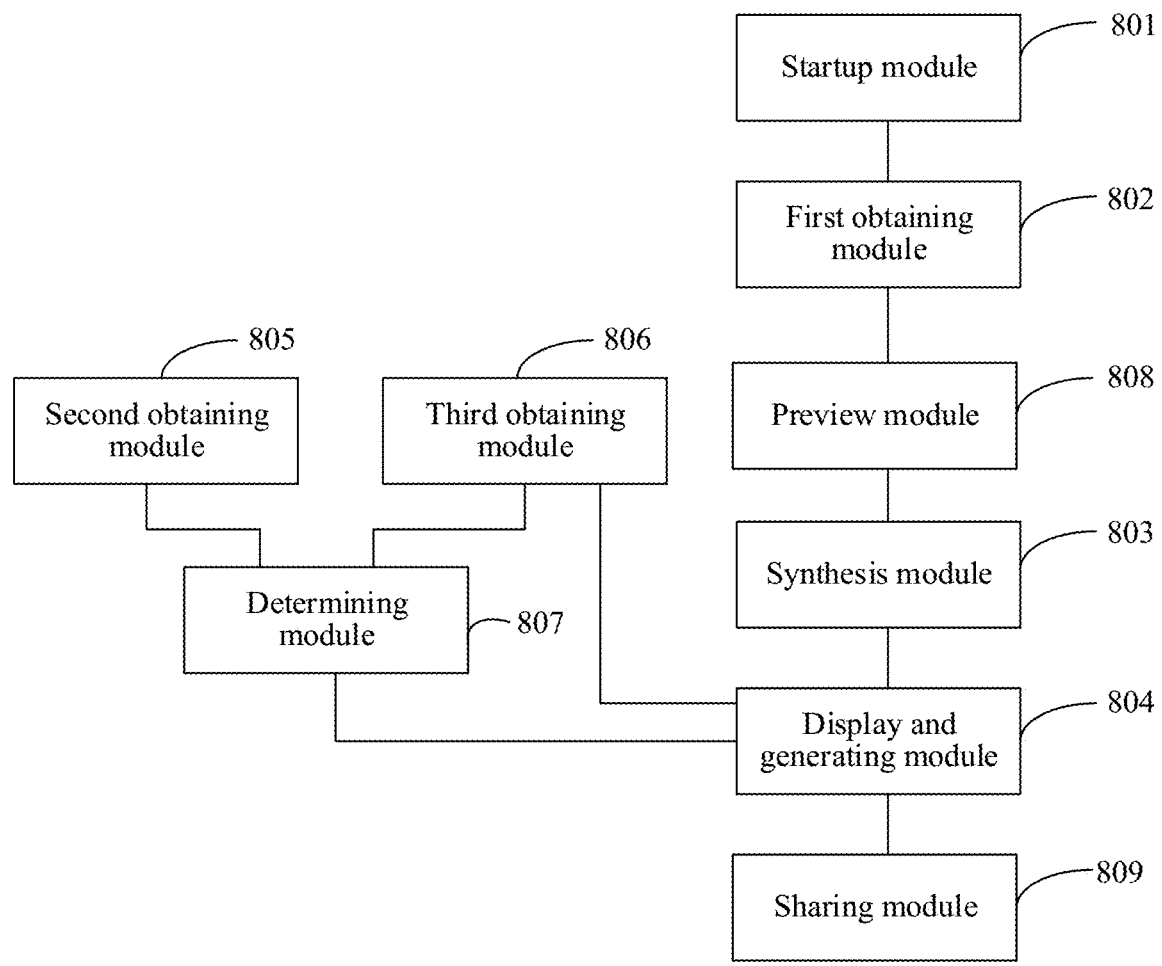
FIG. 8 is another schematic structural diagram of an apparatus for generating a video file according to an embodiment of this disclosure.

Further, referring to FIG. 8, an embodiment of this disclosure further provides an apparatus for generating a video file. The apparatus may be, for example, integrated into a terminal such as a mobile phone. The apparatus includes: a startup module 801, a first obtaining module 802, a synthesis module 803, a display and generating module 804, a second obtaining module 805, a third obtaining module 806, a determining module 807, a preview module 808, and a sharing module 809.

The startup module 801, the first obtaining module 802, the synthesis module 803, and the display and generating module 804 have the same function as the startup module 701, the first obtaining module 702, the synthesis module 703, and the display and generating module 704, respectively. For details, refer to descriptions of the startup module 701, the first obtaining module 702, the synthesis module 703, and the display and generating module 704 in FIG. 7.

The second obtaining module 805 is configured to: start a voice input apparatus after the simulated video call request is received, and obtain first voice information by using the voice input apparatus. The first voice information includes voice information inputted by the user. The voice input apparatus is, for example, a built-in microphone of the terminal. The third obtaining module 806 is configured to: when the display and generating module 804 displays the simulated video call image frame in the simulated video call window, obtain voice information of the source video currently played in the simulated video call window, to obtain second voice information. The second voice information is voice information corresponding to the source video image frame included in the currently displayed simulated video call image frame. The determining module 807 is configured to determine, according to the first voice information and the second voice information, voice information corresponding to the simulated video call image frame.

The display and generating module 804 is specifically configured to: each time a simulated video call image frame is obtained through synthesis, perform video encoding on the simulated video call image frame to obtain a video frame corresponding to the simulated video call image frame; when a saving instruction of the user is received, generate a picture video according to all video frames, and generate an audio track file according to voice information corresponding to all the video frames respectively; and synthesize the picture video with the audio track file to obtain the video file of the simulated video call. The voice information corresponding to the video frames is voice information that corresponds to the simulated video call image frames corresponding to the video frames.

In this embodiment, the display of the simulated video call image frame and the video encoding of the simulated video call image frame are synchronously performed. That is, after the user image frame and the source video image frame are synthesized to obtain a simulated video call image frame, the simulated video call image frame is displayed in the simulated video call window, and the simulated video call image frame is transmitted to a video encoder for the video encoding, to be converted to a video frame and stored, instead of encoding all the simulated video call image frames one by one after the simulated video call is ended, thereby further reducing the time required for generating the video file.

The display and generating module 804 may specifically synthesize the picture video and the audio track file by using system hardware. The picture video and the audio track file are synthesized by using system hardware, so that a synthesis speed can be improved, and better stability performance is achieved. When the hardware synthesis fails, third-party synthesis software may be used for synthesis. For example, ffmpeg audio video codec software is used for synthesizing the picture video with the audio track file.

The preview module 808 is configured to: before the display and generating module 804 synthesizes the picture video with the audio track file, synchronously play the picture video and the audio track file in the preview window. Therefore, the user may preview the video file related to the simulated video call.

The sharing module 809 is configured to share the video file to a social network application according to a sharing instruction of the user.

By providing the user with a function of sharing the video file related to the simulated video call, the user may share the video file, to generate a hotspot through secondary spreading and sharing, so that the advertisement in the source video is spread more widely. The application is more interesting and can attract more users. In addition, in this embodiment, only one video player is needed to play the picture video in a preview stage. Compared with using two video players to play the source video and the user video respectively, memory resources occupied in the preview stage can be reduced, so that the requirement on the hardware of the terminal is lower, and a middle or low end terminal can be better supported, thereby achieving better stability and expansibility.

Figure 9:
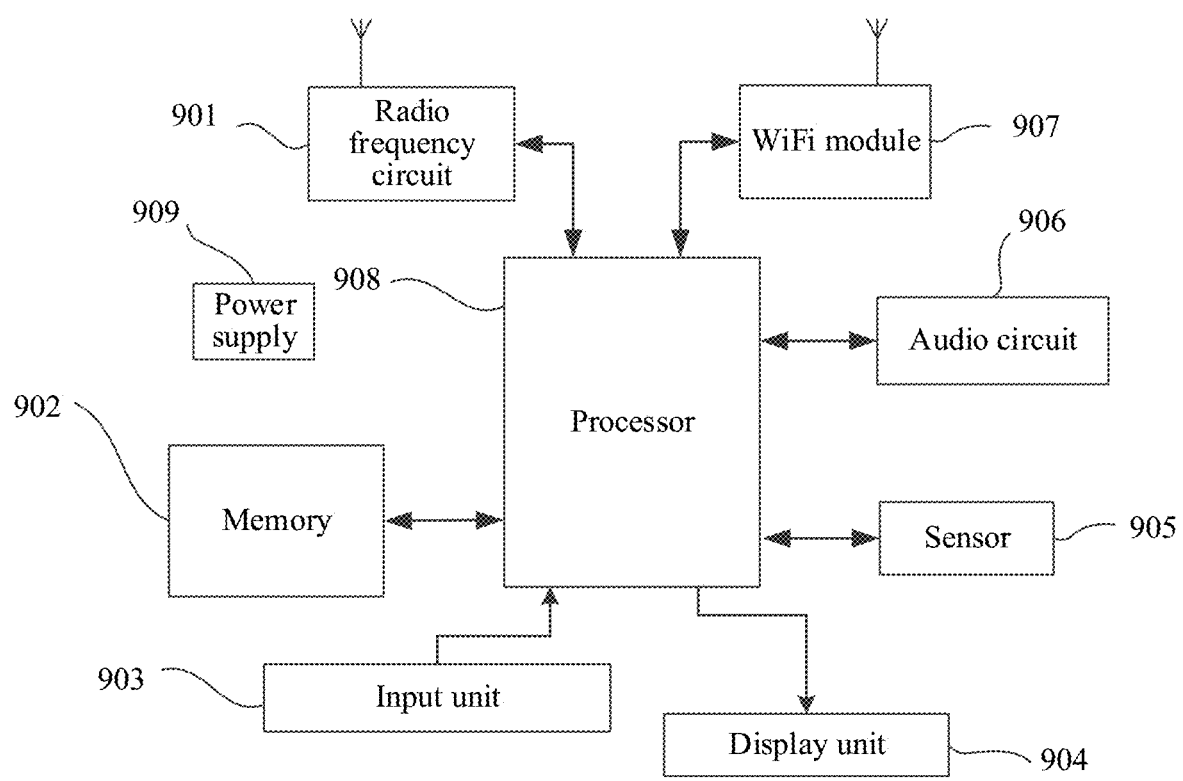
FIG. 9 is a schematic structural diagram of a terminal according to an embodiment of this disclosure.

Correspondingly, an embodiment of this disclosure further provides a terminal. As shown in FIG. 9, the terminal may include components such as a radio frequency (RF) circuit 901, a memory 902 including one or more computer-readable non-transitory storage media, an input unit 903, a display unit 904, a sensor 905, an audio circuit 906, a Wireless Fidelity (WiFi) module 907, a processor 908 including one or more processing cores, and a power supply 909. A person skilled in the art may understand that, a terminal structure shown in FIG. 9 does not constitute a limitation to the terminal, and the terminal may include more or fewer components than those shown in the figure, or some components may be combined, or a different component deployment may be used.

The RF circuit 901 may be configured to receive and transmit signals in an information receiving and transmitting process or a call process. Specifically, after receiving downlink information from a base station, the RF circuit delivers the downlink information to one or more processors 908 for processing, and transmits related uplink data to the base station. Generally, the RF circuit 901 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 901 may also communicate with a network and another device by wireless communication. The wireless communication may use any communication standard or protocol, which includes, but is not limited to, Global system for mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 902 may be configured to store a software program and a module. The processor 908 runs the software program and the module stored in the memory 902, to perform various functional applications and data processing. The memory 902 may mainly include a program storage area and a data storage area. The program storage area may store an operating system, an application program required by at least one function (such as a sound playback function and an image display function), and the like. The program storage area may store data (such as audio data and an address book) created according to the use of the terminal, and the like. In addition, the memory 902 may include a high-speed random access memory, and may further include a non-volatile memory, such as at least one magnetic disk storage device, a flash memory, or another volatile solid-state storage device. Correspondingly, the memory 902 may further include a memory controller, so as allow the processor 908 and the input unit 903 to access the memory 902.

The input unit 903 may be configured to receive input digit or character information, and generate a keyboard, mouse, joystick, optical, or track ball signal input related to a user setting and function control. Specifically, in a specific embodiment, the input device 903 may include a touch-sensitive surface and another input device. The touch-sensitive surface, also known as a touchscreen or a touch panel, may collect a touch operation of a user on or near the touch-sensitive surface (such as an operation of a user on or near the touch-sensitive surface by using any suitable object or accessory, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 908. Moreover, the touch controller may receive and execute a command transmitted from the processor 908. In addition, the touch-sensitive surface may be a resistive, capacitive, infrared, or surface acoustic wave typed touch-sensitive surface. In addition to the touch-sensitive surface, the input unit 903 may further include another input device. Specifically, the another input device may include, but is not limited to, one or more of a physical keyboard, a functional key (such as a volume control key or a switch key), a track ball, a mouse, a joystick, and the like.

The display unit 904 may be configured to display information inputted by the user or information provided for the user, and various graphical user interfaces of the terminal. The graphical user interfaces may include a graph, a text, an icon, a video, and any combination thereof. The display unit 904 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 908, so as to determine a type of the touch event. Then, the processor 908 provides a corresponding visual output on the display panel according to the type of the touch event. Although in FIG. 9, the touch-sensitive surface and the display panel are used as two separate parts to implement input and output functions, in some embodiments, the touch-sensitive surface and the display panel may be integrated to implement the input and output functions.

The terminal may further include at least one sensor 905, for example, an optical sensor, a motion sensor, and another sensor. Specifically, the optical sensor may include an ambient light sensor and a proximity sensor. The ambient light sensor may adjust luminance of the display panel according to brightness of the ambient light. The proximity sensor may switch off the display panel and/or backlight when the terminal is moved to ears. As one type of motion sensor, a gravity acceleration sensor may detect magnitude of accelerations at various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal, are not described herein again.

The audio circuit 906, a speaker, and a microphone may provide audio interfaces between the user and the terminal. The audio circuit 906 may convert received audio data into an electric signal and transmit the electric signal to the speaker. The speaker converts the electric signal into a sound signal for output. On the other hand, the microphone converts a collected sound signal into an electric signal. The audio circuit 906 receives the electric signal and converts the electric signal into audio data, and outputs the audio data to the processor 908 for processing. Then, the processor transmits the audio data to, for example, another terminal by using the RF circuit 901, or outputs the audio data to the memory 902 for further processing. The audio circuit 906 may further include an earplug jack, so as to provide communication between a peripheral earphone and the terminal.

WiFi is a short distance wireless transmission technology. The terminal may help, by using a WiFi module 907, the user to receive and transmit emails, browse webpages, access stream media, and the like, which provides wireless broadband Internet access for the user. Although FIG. 9 shows the WiFi module 907, it may be understood that the WiFi module is not a necessary component of the terminal, and the Wi-Fi module may be omitted as required as long as the scope of the essence of this disclosure is not changed.

The processor 908 is a control center of the terminal, and is connected to various parts of the mobile phone by using various interfaces and lines. By running or executing the software program and/or module stored in the memory 902, and invoking data stored in the memory 902, the processor performs various functions and data processing of the terminal, thereby performing overall monitoring on the mobile phone. Optionally, the processor 908 may include one or more processing cores. Preferably, the processor 908 may integrate an application processor and a modem processor. The application processor mainly processes an operating system, a user interface, an application, and the like. The modem processor mainly processes wireless communication. It may be understood that the foregoing modem may either not be integrated into the processor 908.

The terminal further includes the power supply 909 (such as a battery) for supplying power to the components. Preferably, the power supply may logically connect to the processor 908 by using a power supply management system, thereby implementing functions, such as charging, discharging, and power consumption management, by using the power supply management system. The power supply 909 may further include one or more of a direct current or alternate current power supply, a re-charging system, a power supply failure detection circuit, a power supply converter or inverter, a power supply state indicator, or any other component.

Although not shown in the figure, the terminal may further include a camera, a Bluetooth module, and the like. Details are not described herein again. Specifically, in this embodiment, the processor 908 in the terminal may load executable files corresponding processes of the one or more application programs to the memory 902 according to the following instructions, and runs the application programs stored in the memory 902, so as to implement various functions:

starting an image acquisition apparatus to acquire a user image in real time, and starting a video decoding component to decode a predetermined source video, in a case that a simulated video call request is received; then synchronously obtaining a user image frame currently acquired by the image acquisition apparatus and a source video image frame currently decoded by the video decoding component, and synthesizing the synchronously obtained user image frame and the source video image frame to obtain a simulated video call image frame; and displaying the simulated video call image frame in a simulated video call window, and generating, according to all the obtained simulated video call image frames, a video file related to a simulated video call.

Texture data of the user image frame and texture data of the source video image frame may be obtained. Then, the texture data of the source video image frame is rendered according to a first rendering parameter, and the texture data of the source video image frame is rendered according to a second rendering parameter. The rendered user image frame is synthesized into the rendered source video image frame, to obtain the simulated video call image frame.

Each time a simulated video call image frame is obtained, video encoding is performed on the obtained simulated video call image frame, to obtain a video frame corresponding to the simulated video call image frame. After an instruction for completing a simulated video call is received, the video file related to the simulated video call is generated according to all the video frames.

After the simulated video call request is received, a voice input apparatus is started, and first voice information is obtained by using the voice input apparatus. In a case that the simulated video call image frame is displayed in the simulated video call window, voice information of the source video currently played in the simulated video call window is obtained, to obtain second voice information. Voice information corresponding to the simulated video call image frame is determined according to the first voice information and the second voice information, and voice information corresponding to the video frame is further determined after the video frame corresponding to the simulated video call image frame is obtained.

A picture video is generated according to all the video frames, and an audio track file is generated according to voice information corresponding to all the video frames respectively. Then, the picture video and the audio track file are synthesized, to obtain the video file related to the simulated video call.

The picture video and the audio track file may be synthesized in a hardware synthesis manner. The picture video and the audio track file are synthesized in a software synthesis manner in a case that the hardware synthesis fails.

A person of ordinary skill in the art may understand that, all or some steps of various methods in the embodiments may be implemented through instructions, or implemented through instructions controlling relevant hardware, and the instructions may be stored in a computer-readable non-transitory storage medium and loaded and executed by a processor.

Accordingly, an embodiment of this disclosure provides a non-transitory storage medium, storing a plurality of instructions, the instructions being configured to be loaded by a processor, to perform the steps of any method for generating a video file according to the embodiments of this disclosure. For example, the instructions may perform the following steps:

starting an image acquisition apparatus to acquire a user image in real time, and starting a video decoding component to decode a predetermined source video, in a case that a simulated video call request is received; then synchronously obtaining a user image frame currently acquired by the image acquisition apparatus and a source video image frame currently decoded by the video decoding component, and synchronizing the synchronously obtained user image frame and the source video image frame to obtain a simulated video call image frame; and displaying the simulated video call image frame in a simulated video call window, and generating, according to all the obtained simulated video call image frames, a video file related to a simulated video call.

Texture data of the user image frame and texture data of the source video image frame may be obtained. Then, the texture data of the source video image frame is rendered according to a first rendering parameter, and the texture data of the source video image frame is rendered according to a second rendering parameter. The rendered user image frame is synthesized into the rendered source video image frame, to obtain the simulated video call image frame.

Each time a simulated video call image frame is obtained, video encoding is performed on the obtained simulated video call image frame, to obtain a video frame corresponding to the simulated video call image frame. After an instruction for completing a simulated video call is received, the video file related to the simulated video call is generated according to all the video frames.

After the simulated video call request is received, a voice input apparatus is started, and first voice information is obtained by using the voice input apparatus. In a case that the simulated video call image frame is displayed in the simulated video call window, voice information of the source video currently played in the simulated video call window is obtained, to obtain second voice information. Voice information corresponding to the simulated video call image frame is determined according to the first voice information and the second voice information, and voice information corresponding to the video frame is further determined after the video frame corresponding to the simulated video call image frame is obtained.

A picture video is generated according to all the video frames, and an audio track file is generated according to voice information corresponding to all the video frames respectively. Then, the picture video and the audio track file are synthesized, to obtain the video file related to the simulated video call.

The picture video and the audio track file may be synthesized in a hardware synthesis manner. The picture video and the audio track file are synthesized in a software synthesis manner in a case that the hardware synthesis fails.

For specific implementation of the above operations, refer to the foregoing embodiments, and details are not described herein again.

The non-transitory storage medium may include: a read-only memory (ROM), a random access memory (RAM), a magnetic disk, an optical disc, or the like.

Because the instructions stored in the non-transitory storage medium may perform the steps of any method for generating a video file provided in the embodiments of this disclosure, the instructions may achieve advantageous effects that may be achieved by any method for generating a video file provided in the embodiments of this disclosure. For details, refer to the foregoing embodiments. Details are not described herein again.

The method and apparatus for generating a video file, and the non-transitory storage medium according to the embodiments of this disclosure are described in detail above. The principle and implementations of this disclosure are described herein by using specific embodiments. The descriptions of the embodiments are merely used for helping understand the method and the core idea of this disclosure. In addition, a person skilled in the art can make modifications to this disclosure in terms of the specific implementations and application scopes according to the idea of this disclosure. In conclusion, the content of the specification shall not be construed as a limitation to this disclosure.

What is claimed is:

1. A method for generating a composite video by a terminal device, comprising:
   obtaining pre-recorded source video frames;
   determining a first set and a second set of video rendering parameters;
   displaying the pre-recorded source video frames with a first image size at a first image position on a display screen of the terminal device according to the first set of video rendering parameters;
   capturing real-time video frames using an image acquisition component of the terminal device in response to content of and in synchronization with the displayed pre-recorded source video frames;
   displaying the real-time video frames with a second image size at a second image position on the display screen of the terminal device according to the second set of video rendering parameters;
   generating a composite video with each video frame comprising a first corresponding frame from the pre-recorded source video frames and a second corresponding frame from the real-time video frames based on the first image size, the second image size, the first image position, and the second image position; and
   synthesizing first voice information uttered by a user engaging in an oral conversation with a character in the displayed pre-recorded source video frames and reply voice information corresponding to the first voice information with the composite video.

2. The method according to claim 1, wherein the real-time video frames are captured by the image acquisition component while the user interacts with the displayed pre-recorded source video frames.

3. The method according to claim 2, wherein the user interacts with the displayed pre-recorded source video frames by engaging in the oral conversation with the character in the displayed pre-recorded source video frames.

4. The method according to claim 2, wherein the interaction between the user and the displayed pre-recorded source video frames comprises:
   obtaining the first voice information uttered by the user using a voice input component of the terminal device;
   automatically deriving, according to the first voice information, the reply voice information; and
   playing the reply voice information.

5. The method according to claim 1, further comprising post-processing the composite video to obtain an updated composite video, by at least one of:
   filtering the composite video using a visual effect filter;
   adding a special visual background to the composite video; or
   adding a background sound or music to the composite video.

6. The method according to claim 1, wherein synthesizing the first voice information and the reply voice information with the composite video comprises:
   synthesizing the first voice information and the reply voice information with the composite video by hardware synthesis; and
   synthesizing the first voice information and the reply voice information with the composite video by software synthesis when the hardware synthesis fails.

7. The method according to claim 1, wherein before displaying the pre-recorded source video frames, the method further comprises selecting the pre-recorded source video frames based on at least one of:
   an event associated with a current date; or
   a location of a user of the terminal device.

8. The method according to claim 1, wherein displaying the pre-recorded source video frames and displaying the real-time video frames comprises:
   displaying the real-time video frames as an overlay on the pre-recorded source video frames or displaying the pre-recorded source video frames as an overlay on the real-time video frames on the display screen of the terminal device.

9. A device for generating a composite video, comprising a memory for storing instructions and a processor in communication with the memory, wherein the processor is configured to execute the instructions to cause the device to:
   obtain pre-recorded source video frames;
   determine a first set and a second set of video rendering parameters;
   display the pre-recorded source video frames with a first image size at a first image position on a display screen of the device according to the first set of video rendering parameters;
   capture real-time video frames using an image acquisition component of the device in response to content of and in synchronization with the displayed pre-recorded source video frames;
   display the real-time video frames with a second image size at a second image position on the display screen of the device according to the second set of video rendering parameters;
   generate a composite video with each video frame comprising a first corresponding frame from the pre-recorded source video frames and a second corresponding frame from the real-time video frames based on the first image size, the second image size, the first image position, and the second image position; and
   synthesize first voice information uttered by a user engaging in an oral conversation with a character in the displayed pre-recorded source video frames and reply voice information corresponding to the first voice information with the composite video.

10. The device according to claim 9, wherein the real-time video frames are captured by the image acquisition component while the user interacts with the displayed pre-recorded source video frames.

11. The device according to claim 10, wherein the user interacts with the displayed pre-recorded source video frames by engaging in the oral conversation with the character in the displayed pre-recorded source video frames.

12. The device according to claim 10, wherein the interaction between the user and the displayed pre-recorded source video frames comprises:
   obtaining the first voice information uttered by the user using a voice input component of the device;
   automatically deriving, according to the first voice information, the reply voice information; and playing the reply voice information.

13. The device according to claim 9, wherein the processor, when executing the instructions, is configured to further cause the device to post-process the composite video to obtain an updated composite video, by at least one of:
  filtering the composite video using a visual effect filter;
  adding a special visual background to the composite video; or
  adding a background sound or music to the composite video.

14. The device according to claim 9, wherein the processor, when executing the instructions to cause the device to synthesize the first voice information and the reply voice information with the composite video, is configured to cause the device to:
  synthesize the first voice information and the reply voice information with the composite video by hardware synthesis; and
  synthesize the first voice information and the reply voice information with the composite video by software synthesis when the hardware synthesis fails.

15. The device according to claim 9, wherein the processor, before executing the instructions to cause the device to display the pre-recorded source video frames, is configured to further cause the device to select the pre-recorded source video frames based on at least one of:
  an event associated with a current date; or
  a location of a user of the device.

16. The device according to claim 9, wherein the processor, when executing the instructions to cause the device to display the pre-recorded source video frames and display the real-time video frames, is configured to cause the device to:
  display the real-time video frames as an overlay on the pre-recorded source video frames or display the pre-recorded source video frames as an overlay on the real-time video frames on the display screen of the device.

17. A non-transitory storage medium for storing computer readable instructions, the computer readable instructions, when executed by a processor, causing the processor to:
  obtain pre-recorded source video frames;
  determine a first set and a second set of video rendering parameters;
  display the pre-recorded source video frames with a first image size at a first image position on a display screen of a terminal device according to the first set of video rendering parameters;
  capture real-time video frames using an image acquisition component of the terminal device in response to content of and in synchronization with the displayed pre-recorded source video frames;
  display the real-time video frames with a second image size at a second image position on the display screen of the terminal device according to the second set of video rendering parameters;
  generate a composite video with each video frame comprising a first corresponding frame from the pre-recorded source video frames and a second corresponding frame from the real-time video frames based on the first image size, the second image size, the first image position, and the second image position; and
  synthesize first voice information uttered by a user engaging in an oral conversation with a character in the displayed pre-recorded source video frames and reply voice information corresponding to the first voice information with the composite video.

18. The non-transitory storage medium according to claim 17, wherein the real-time video frames are captured by the image acquisition component while the interacts with the displayed pre-recorded source video frames.

* * * * *